(12) United States Patent
Funakura (10) Patent No.: US 7,512,335 B2
(45) Date of Patent: Mar. 31, 2009

(54) IMAGE CAPTURING APPARATUS, AN IMAGE CAPTURING METHOD, AND A MACHINE READABLE MEDIUM STORING THEREON A COMPUTER PROGRAM FOR CAPTURING IMAGES

(75) Inventor: Hiroyuki Funakura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 353 days.

(21) Appl. No.: 11/342,703

(22) Filed: Jan. 31, 2006

(65) Prior Publication Data

US 2006/0193623 A1    Aug. 31, 2006

(30) Foreign Application Priority Data

Feb. 25, 2005    (JP)    ............................. 2005-052017

(51) Int. Cl.
*G03B 17/24*    (2006.01)

(52) U.S. Cl. ..................... 396/310; 396/312; 348/231.4; 348/462

(58) Field of Classification Search ................. 396/312, 396/310; 348/231.4, 462
See application file for complete search history.

(56) References Cited

U.S. PATENT DOCUMENTS 4,270,853 A * 6/1981 Hatada et al. .................. 396/33
5,521,663 A * 5/1996 Norris, III ................... 396/312
6,397,184 B1 * 5/2002 Walker ......................... 704/270
7,268,801 B2 * 9/2007 Hirunuma et al. ........ 348/207.99

FOREIGN PATENT DOCUMENTS

JP        7-154734 A        6/1995

* cited by examiner

*Primary Examiner*—W. B. Perkey
*Assistant Examiner*—Michael A Strieb
(74) *Attorney, Agent, or Firm*—Birch, Stewart, Kolasch & Birch, LLP (57) ABSTRACT

It is an object of the present invention to provide an image capturing apparatus which can easily acquire a sound proper for a captured image. An image capturing apparatus includes an image capturing position detecting unit for detecting the position where an image capturing unit captures an image, a recording unit for recording a sound around the image capturing unit, a voice judging unit for judging whether or not the sound recorded by the recording unit includes a human voice, a sound acquiring unit for acquiring the sound recorded by the recording unit in case the voice judging unit judges that a human voice is included and acquiring a sound which a sound database stores correspondingly to the position detected by the image capturing position detecting unit in case the voice judging unit judges that no human voice is included, and an image and sound storing unit for storing the image captured by the image capturing unit and the sound acquired by the sound acquiring unit in a corresponding manner.

10 Claims, 9 Drawing Sheets

| POSITION | | TIME | SOUND |
|---|---|---|---|
| LATITUDE | LONGITUDE | | |
| 34"00 | 135"00 | 2004-12-15-13:30:00 | SOUND DATA 301 |
| 34"02 | 135"01 | 2004-12-15-14:10:00 | SOUND DATA 302 |
| 34"03 | 135"02 | 2004-12-15-14:30:00 | SOUND DATA 303 |
| ⋮ | ⋮ | ⋮ | ⋮ |

| KIND OF OBJECT | TIME | SOUND |
|---|---|---|
| DOG | 2004-12-15-13:30:00 | SOUND DATA 701 |
| ELEPHANT | 2004-12-15-14:10:00 | SOUND DATA 702 |
| CAR | 2004-12-15-14:30:00 | SOUND DATA 703 |
| ⋮ | ⋮ | ⋮ |

IMAGE CAPTURING APPARATUS, AN IMAGE CAPTURING METHOD, AND A MACHINE READABLE MEDIUM STORING THEREON A COMPUTER PROGRAM FOR CAPTURING IMAGES

CROSS REFERENCE TO RELATED APPLICATION

This application claims priority from a Japanese Patent Application No. JP 2005-052017 filed on Feb. 25, 2005, the contents of which are incorporated herein by reference.

BACKGROUND OF THE INVENTION

1. Field of the Invention

The present invention relates to an image capturing apparatus, an image capturing method, and a machine readable medium storing thereon a computer program for capturing images. More particularly, the present invention relates to an image capturing apparatus and an image capturing method for capturing images, and a machine readable medium storing thereon a computer program for the image capturing apparatus. Description of the 2. Related Art Conventionally, there is a digital still camera which can record not only a still picture bus also a moving picture on a memory card. This kind of digital still camera can record a sound detected by a microphone together with a corresponding still picture or a moving picture when capturing and recording the still picture or the moving picture as described in Japanese Patent Application Publication No. 1995-154734 for example.

Further, an electric photo-stand, which can reproduce a sound recorded correspondingly to a still picture or a moving picture captured by the digital still camera while displaying the still picture or the moving picture, is known.

SUMMARY OF THE INVENTION

However, in case of using this kind of camera, sometimes noises around the camera is recorded when capturing and recording an image. In this case, the noises are reproduced when the recorded image is reproduced and thus a user cannot enjoy the image. In case the user thinks a sound around the camera undesirable, it is desirable that a sound proper for the captured image is recorded. Further, it is desirable for the user to record and reproduce a sound proper for a captured image in a simple and easy way without complicated works such as editing the image and sounds.

Therefore, it is an object of the present invention to provide an image capturing apparatus, an image capturing method, and a machine readable medium storing thereon a computer program for capturing images, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an image capturing apparatus includes: an image capturing unit for capturing an image; an image capturing position detecting unit for detecting the position where the image capturing unit captures an image; a recording unit for recording a sound around the image capturing unit; a voice judging unit for judging whether or not the sound recorded by the recording unit includes a human voice; a sound acquiring unit for acquiring the sound recorded by the recording unit in case the voice judging unit judges that a human voice is included and acquiring a sound which a sound database stores correspondingly to the position detected by the image capturing position detecting unit in case the voice judging unit judges that no human voice is included; and an image and sound storing unit for storing the image captured by the image capturing unit and the sound acquired by the sound acquiring unit in a corresponding manner.

The image capturing apparatus may further include a sound database for storing a sound recorded by the recording unit with the position where the sound is recorded in a corresponding manner, and, in case the voice judging unit judges that no human voice is included, the sound acquiring unit may acquire a sound which the sound database stores correspondingly to the position detected by the image capturing position detecting unit.

The sound database may store the sound recorded by the recording unit with the time when the sound is recorded in a corresponding manner, the voice judging unit may judge whether or not a human voice is included in sounds within a predetermined first period including the time when the image capturing unit captures the image, and, in case the voice judging unit judges that a human voice is included within the first period, the sound acquiring unit may acquire the sound recorded by the recording unit, and in case the voice judging unit judges that no human voice is included within the first period, the sound acquiring unit may acquire a sound recorded during a second period which includes and is broader than the first period and stored in the sound database correspondingly with the position detected by the image capturing position detecting unit.

The image capturing apparatus may further include a displaying unit for displaying an image of light received by a light receiving element of the image capturing unit, the first period may be a period during which the image capturing apparatus is set to an image capturing mode, that is, an operation mode where the displaying unit is displaying an image; and the second period may be a period including the first period and a period during which the image capturing apparatus is set to a non image capturing mode, that is, an operation mode where the displaying unit does not display an image.

According to the second aspect of the present invention, an image capturing method includes: an image capturing step of capturing an image using an image capturing unit; an image capturing position detecting step of detecting the position where the image capturing unit captures an image; a recording step of recording a sound around the image capturing unit; a voice judging step of judging whether or not the sound recorded in the recording step includes a human voice; a sound acquiring step of acquiring the sound recorded in the recording step in case it is judged in the voice judging step that a human voice is included and acquiring a sound which a sound database stores correspondingly to the position detected in the image capturing position detecting step in case it is judged in the voice judging step that no human voice is included; and an image and sound storing step of storing the image captured by the image capturing unit and the sound acquired in the sound acquiring step in a corresponding manner.

According to the third aspect of the present invention, a machine readable medium storing thereon a program for an image capturing apparatus for capturing an image is provided, wherein the program makes the image capturing apparatus function as an image capturing unit for capturing an image; an image capturing position detecting unit for detecting the position where the image capturing unit captures an image; a recording unit for recording a sound around the image capturing unit; a voice judging unit for judging whether or not the sound recorded by the recording unit includes a human voice; a sound acquiring unit for acquiring the sound recorded by the recording unit in case the voice judging unit judges that a human voice is included and acquiring a sound which a sound database stores correspondingly to the position detected by the image capturing position detecting unit in case the voice judging unit judges that no human voice is included; and an image and sound storing unit for storing the image captured by the image capturing unit and the sound acquired by the sound acquiring unit in a corresponding manner.

According to the fourth aspect of the present invention, an image capturing apparatus includes: an image capturing unit for capturing an image; an object determining unit for determining the kind of an object of an image captured by the image capturing unit; a recording unit for recording a sound around the image capturing unit; a voice judging unit for judging whether or not the sound recorded by the recording unit includes a human voice; a sound acquiring unit for acquiring the sound recorded by the recording unit in case the voice judging unit judges that a human voice is included and acquiring a sound which a sound database stores correspondingly to the kind of the object determined by the object determining unit in case the voice judging unit judges that no human voice is included; and an image and sound storing unit for storing the image captured by the image capturing unit and the sound acquired by the sound acquiring unit in a corresponding manner.

The image capturing apparatus may further include a sound database for storing a sound recorded by the recording unit with the kind of an object determined by the object determining unit when the sound is recorded in a corresponding manner, and, in case the voice judging unit judges that no human voice is included, the sound acquiring unit may acquire a sound which the sound database stores correspondingly to the kind of the object determined by the object determining unit.

The sound database may store the sound recorded by the recording unit with the time when the sound is recorded in a corresponding manner, the voice judging unit may judge whether or not a human voice is included in sounds within a predetermined first period from the time when the image capturing unit captures the image. In case the voice judging unit may judge that a human voice is included within the first period, the sound acquiring unit acquires the sound recorded by the recording unit, and in case the voice judging unit judges that no human voice is included within the first period, the sound acquiring unit may acquire a sound recorded during a second period which is broader than the first period from the image capturing time of the image capturing unit and stored in the sound database correspondingly with the kind of the object determined by the object determining unit.

The image capturing apparatus may further include a displaying unit for displaying an image of light received by a light receiving element of the image capturing unit, the first period may be a period during which the image capturing apparatus is set to an image capturing mode, that is, an operation mode where the displaying unit is displaying an image, and the second period may be a period including the first period and a period during which the image capturing apparatus is set to a non image capturing mode, that is, an operation mode where the displaying unit does not display an image.

According to the fifth aspect of the present invention, an image capturing method includes: an image capturing step of capturing an image using an image capturing unit; an object determining step of determining the kind of an object of an image captured by the image capturing unit; a recording step of recording a sound around the image capturing unit; a voice judging step of judging whether or not the sound recorded in the recording step includes a human voice; a sound acquiring step of acquiring the sound recorded in the recording step in case it is judged in the voice judging step that a human voice is included and acquiring a sound which a sound database stores correspondingly to the kind of the object determined in the object determining step in case it is judged in the voice judging step that no human voice is included; and an image and sound storing step of storing the image captured by the image capturing unit and the sound acquired in the sound acquiring step in a corresponding manner.

According to the sixth aspect of the present invention, a machine readable medium storing thereon a program for an image capturing apparatus for capturing an image is provided, wherein the program makes the image capturing apparatus function as an image capturing unit for capturing an image; an object determining unit for determining the kind of an object of an image captured by the image capturing unit; a recording unit for recording a sound around the image capturing unit; a voice judging unit for judging whether or not the sound recorded by the recording unit includes a human voice; a sound acquiring unit for acquiring the sound recorded by the recording unit in case the voice judging unit judges that a human voice is included and acquiring a sound which a sound database stores correspondingly to the kind of the object determined by the object determining unit in case the voice judging unit judges that no human voice is included; and an image and sound storing unit for storing the image captured by the image capturing unit and the sound acquired by the sound acquiring unit in a corresponding manner.

The summary of the invention does not necessarily describe all necessary features of the present invention. The present invention may also be a sub-combination of the features described above.

According to the present invention, it is possible to provide an image capturing apparatus which can easily get a sound proper for a captured image.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
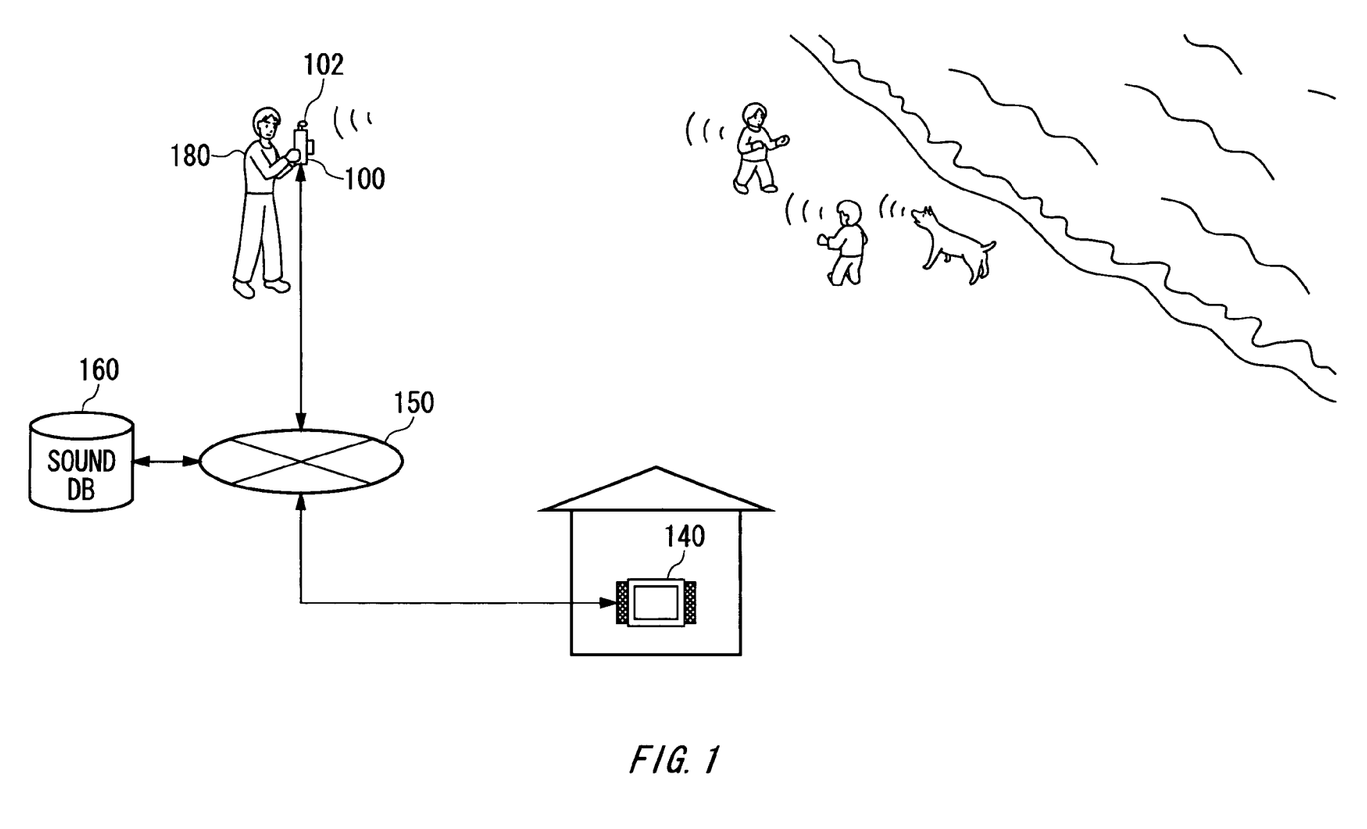
FIG. 1 shows an example of a sound offering system according to an embodiment of the present invention.

FIG. 1 shows an example of a sound offering system according to an embodiment of the present invention. The sound offering system includes an image capturing apparatus 100, an outputting apparatus 140, and a sound database 160. The image capturing apparatus 100 captures an image of a child having a merry time on the seashore on the basis of an instruction of a user 180. At this moment, the image capturing apparatus 100 collects sounds around it using a sound collector 102 and records the sounds. Further, while displaying the captured image on a liquid crystal monitor, the image capturing apparatus 100 collects sounds around it using the sound collector 102 and records the sounds. Then, the image capturing apparatus 100 transfers the captured image and the recorded sounds to the outputting apparatus 140 via a communication line 150 such as the internet.

Further, the image capturing apparatus 100 stores the recorded sound and the position of the image capturing apparatus 100 when recording the sound. Then, in case a sound collected when an image has been captured includes a human voice, the image capturing apparatus 100 records the sound from the sound collector 102 and stores it together with the captured image. In the meantime, in case a sound collected when an image has been captured includes no human voice, the image capturing apparatus 100 acquires a sound previously recorded at the same place as the image capturing place out of sounds stored in a sound database of it or the sound database 160 connected to the communication line 150. By this, even in case a sound around the image capturing apparatus 100 when an image is captured includes no human voice, the image capturing apparatus 100 can provide the user 180 with a sound corresponding to the image capturing place.

The outputting apparatus 140 reproduces the image and the sound received from the image capturing apparatus 100 so that the sound is synchronized with the image. For example, the outputting apparatus 140 may be an apparatus for outputting an image and a sound, such as an HD TV, an electronic photo-stand, a computer, etc. Further, the outputting apparatus 140 may output a sound as letters. For example, the outputting apparatus 140 displays a sound as letters on a display device while displaying an image on the display device. Further, the outputting apparatus 140 may display letters on a display device on which an image is displayed or display the letters on another display device which is different the display device on which the image is displayed. In addition, the outputting apparatus 140 may be a printing apparatus for printing an image such as a printer and print letters corresponding to a sound together with the image.

The image capturing apparatus 100 may be, for example, a digital still camera or a mobile phone with a camera. Further, the image capturing apparatus 100 may record image data and sound data on a recording medium and the outputting apparatus 140 may output an image and a sound by receiving the image data and the sound data from the recording medium. Further, the image capturing apparatus 100 may store image data and sound data in a directory provided to every user 180 of a server connected to the communication line, for example, the directory being related with the image capturing apparatus 100. Then, the outputting apparatus 140 may receive the image data and the sound data stored in the server for every user 180.

Figure 2:
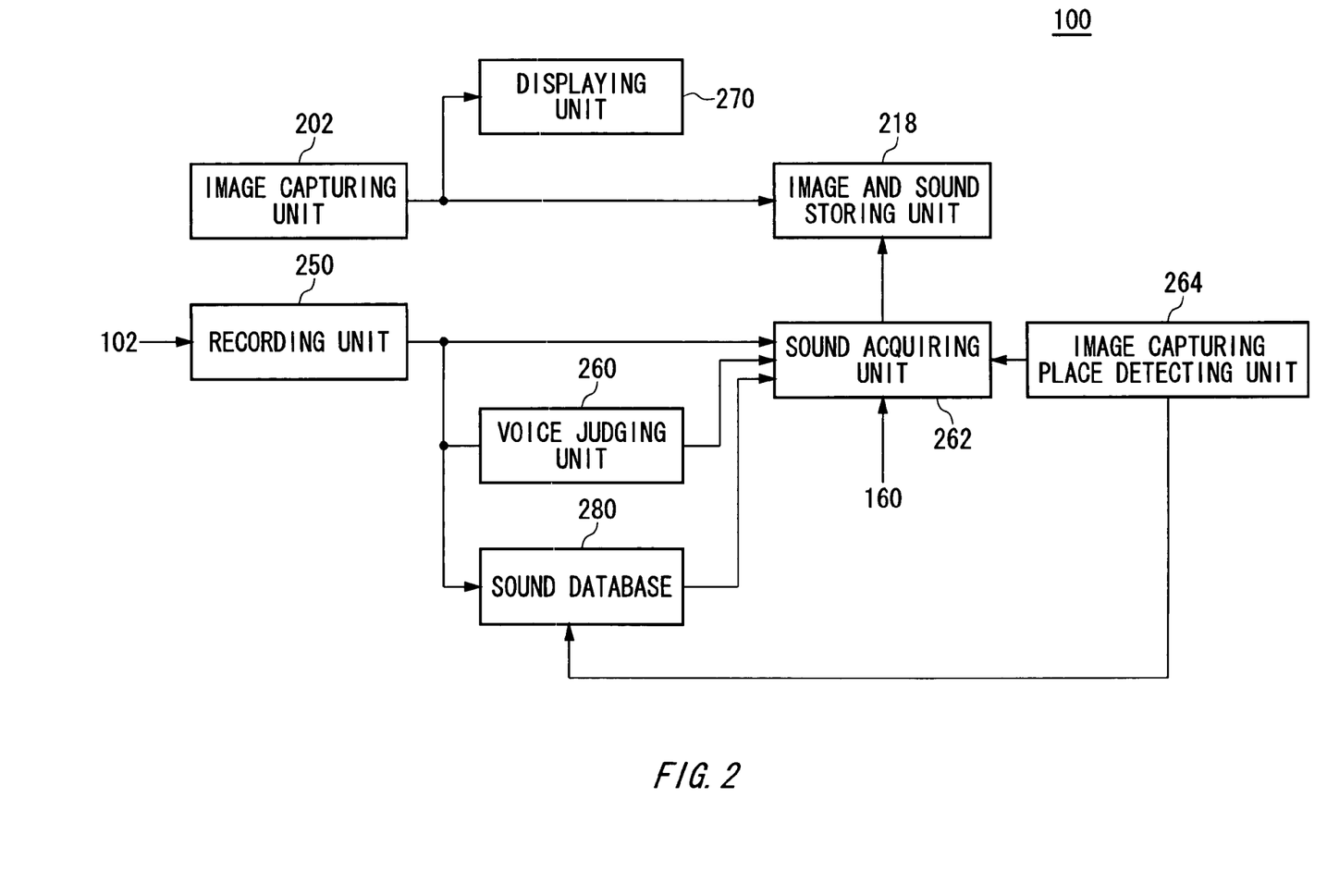
FIG. 2 shows a block diagram of the configuration of an image capturing apparatus 100.

FIG. 2 shows a block diagram of the configuration of the image capturing apparatus 100. The image capturing apparatus 100 includes an image capturing unit 202, a displaying unit 270, an image and sound storing unit 218, a recording unit 250, a sound acquiring unit 262, an image capturing position detecting unit 264, a voice judging unit 260, and a sound database 280.

The image capturing unit 202 captures an image. Specifically, the image capturing unit 202 captures an image by receiving light from an object using an image capturing device such as a CCD. Further, the image capturing unit 202 may capture images of an object consecutively at regular intervals. Then, the image capturing unit 202 may store a predetermined number of images captured consecutively. Then, the image capturing unit 202 may set an image out of the images stored therein, which has been captured at a time nearest to the time when received an instruction of capturing an image, to a captured image.

The image capturing position detecting unit 264 detects the position where an image is captured by the image capturing unit 202. For example, the image capturing position detecting unit 264 detects latitude and longitude information of the place of the image capturing apparatus 100 when it captures an image using GPS information received from a GPS satellite.

The recording unit 250 records sounds around the image capturing unit 202. The voice judging unit 260 judges whether or not the sounds recorded by the recording unit 250 includes a human voice. Specifically, on the basis of frequency spectrum of the sounds recorded by the recording unit 250, the voice judging unit 260 judges whether or not the sounds recorded by the recording unit 250 includes a human voice. For example, in case the frequency spectrum of the recorded sounds includes distinguishing frequency spectrum of a vowel pronounced by a human, the voice judging unit 260 judges that the sounds recorded by the recording unit 250 includes a human voice.

The sound database 280 stores a sound recorded by the recording unit 250 and the position where the sound is recorded in a corresponding manner. Further, the sound database 280 may be provided on the outside of the image capturing apparatus 100. For example, the sound database 280 may be connected to the communication line 150 to which the image capturing apparatus 100 is connected.

In case the voice judging unit 260 judges that sound recorded by the recording unit 250 include a human voice, the sound acquiring unit 262 acquires the sound. Further, in case the voice judging unit 260 judges that sound recorded by the recording unit 250 include no human voice, the sound acquiring unit 262 acquires a sound stored in the sound database 280 which corresponds to the position detected by the image capturing position detecting unit 264. Then, the image and sound storing unit 218 stores the image captured by the image capturing unit 202 and the sound acquired by the sound acquiring unit 262 in a corresponding manner.

Further, the sound database 280 may store a sound recorded by the recording unit 250 and the time when the sound has been recorded in a corresponding manner. Then, the voice judging unit 260 judges whether or not a human voice is included in sounds within a predetermined first period including the time when the image capturing unit 202 captures an image. Then, in case the voice judging unit 260 judges that a human voice is included within the first period, the sound recorded by the recording unit 250 is acquired. Then, in case the voice judging unit 260 judges that no human voice is included within the first period, the sound acquiring unit 262 acquires a sound recorded within a second period which is broader than and includes the first period, which is stored in the sound database 280 and corresponds to the position detected by the image capturing position detecting unit 264. By this, the image capturing position detecting unit 264 can acquire a sound corresponding to the image capturing place.

The displaying unit 270 displays an image of light received by a light receiving element of the image capturing unit 202. For example, the displaying unit 270 may be a liquid crystal monitor for displaying an image which should be captured by the image capturing apparatus 100 at the image capturing time. Then, the first period including the time when the image capturing unit 202 captures an image may be a period during which the image capturing apparatus 100 is set to an image capturing mode, that is, an operation mode where the displaying unit 270 is displaying the image. Further, the second period may be a period including the first period and a period during which the image capturing apparatus 100 is set to a non image capturing mode, that is, an operation mode where the displaying unit 270 does not display an image.

Specifically, the image capturing mode is an operation mode where the image capturing unit 202 operates according to an instruction of the user 180 and may include an operation mode where an image which should be captured is being displayed on the displaying unit 270. Further, the non image capturing mode may include a function mode, that is, an operation mode where the displaying unit 270 does not display an image and an instruction of the user 180 can be accepted. Further, the non image capturing mode may include an output mode, that is, an operation mode where a captured image is output.

Further, the displaying unit 270 may display an image other than light received by the light receiving element of the image capturing unit 202, for example, a captured image. Then, the output mode may include an operation mode where the displaying unit 270 is displaying the captured image.

According to the image capturing apparatus 100 described above, in case the user 180 thinks a sound around the image capturing apparatus 100 when an image is being captured to be undesirable, it is possible to record a sound proper for the place where the image is captured.

Figure 3:
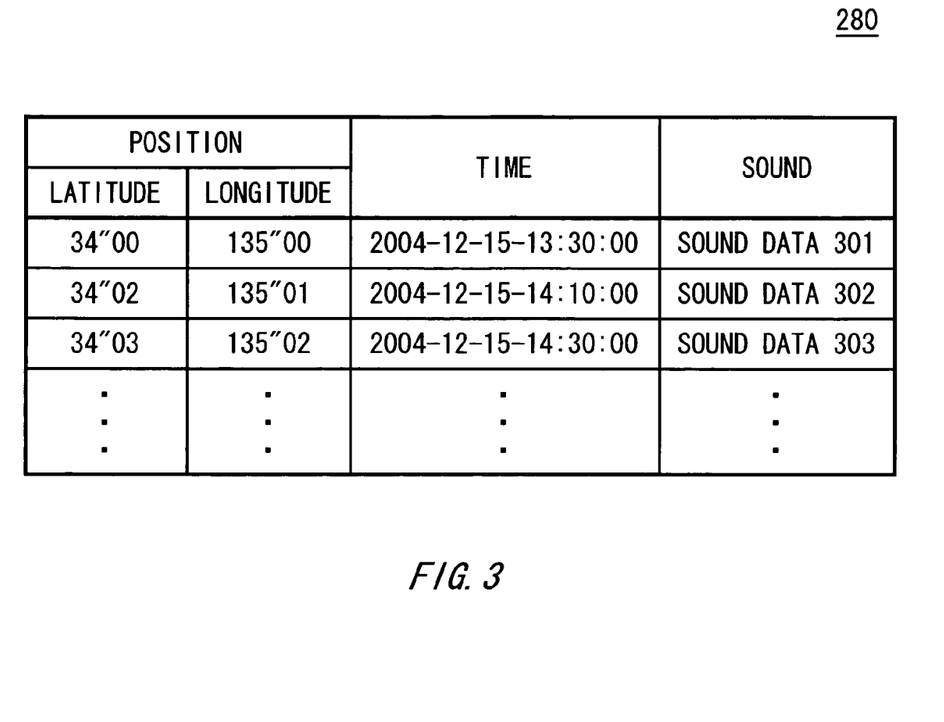
FIG. 3 shows an example of data stored in a sound database 280 in the form of a table.

FIG. 3 shows an example of data stored in the sound database 280 in the form of a table. The sound database 280 stores a plurality of sound data (301, 302, 303) with the latitude and the longitude of the position where each sound data is recorded and the time when the sound data is recorded.

Further, the time when a sound is recorded may be the time when the sound recording is started or ended. Further, the time when a sound is recorded may include date and time when the sound is recorded. Further, the sound database 280 stores a sound in length of an output time, that is, a period during which the captured image is to be output. Further, the sound database 280 may include sound data recorded by a plurality of image capturing apparatus 100.

Figure 4:
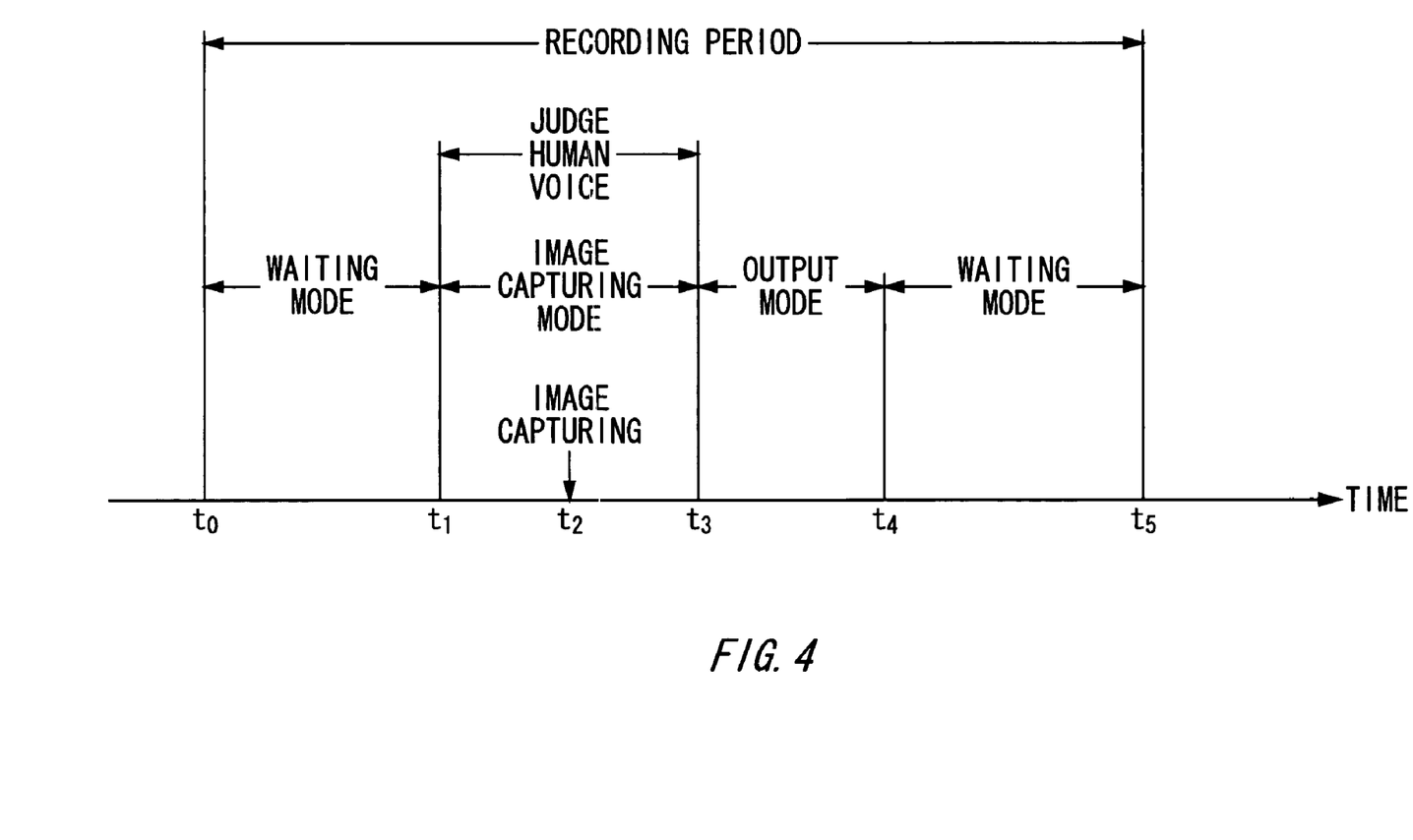
FIG. 4 shows an example of a relationship of time between the operation mode and the sound recording period of the image capturing apparatus 100.

FIG. 4 shows an example of a relationship of time between the operation mode and the sound recording period. The operation mode of the image capturing apparatus 100 includes an image capturing mode, an output mode, and a waiting mode. The image capturing mode may be an operation mode where the image capturing apparatus 100 can capture an image and/or record a sound. Further, the output mode may be, for example, an operation mode where the image capturing apparatus 100 can output an image and/or a sound. Further, a non image capturing mode includes the output mode and the waiting mode. The image capturing apparatus 100 records sounds collected by the sound collector 102 during a period (t1~t3) during which it is set to the image capturing mode, a period (t3~t4) during which it is set to the output mode, and periods (t0~t1 and t4~t5) during which it is set to the waiting mode.

Further, the image capturing apparatus 100 is set to the waiting mode just after it begins to operate. In case the user 180 operates the image capturing apparatus 100 for image capturing or sound recording, the operation mode of the image capturing apparatus 100, which has been set to the waiting mode or the output mode, is switched to the image capturing mode. The operation for image capturing includes operations of capturing an image, adjusting image capturing conditions such as a shutter speed and a focal length, and the like, for example. Further, the operation for sound recording includes operations of recording sounds, adjusting recording conditions such as recording sensitivity, and the like, for example. Further, in case the user 180 operates the image capturing apparatus 100 for output, the operation mode of the image capturing apparatus 100, which has been set to the waiting mode or the image capturing mode, is switched to the output mode. The operation for output includes operations of outputting an image, selecting an image to be output, adjusting output conditions such as an output speed, and the like, for example. Further, on conditions that the user 180 does not operate the image capturing apparatus 100 for a predetermined period, the operation mode of the image capturing apparatus 100, which has been set to the image capturing mode or the output mode, is switched to the waiting mode.

The voice judging unit 260 judges whether or not sounds recorded for a predetermined period ago or from an image capturing time t2 include a human voice. For example, in case the user 180 instructs the image capturing apparatus 100 to capture an image at the time t2, the voice judging unit 260 judges whether or not sounds recorded by the recording unit 250 during the period (t1~t3), which includes the image capturing time t2 and is set to the image capturing mode, includes a human voice. Then, in case it is judged that a human voice is included by the voice judging unit 260, the sound acquiring unit 262 acquires the sounds recorded by the recording unit 250 during the period (t1~t3) and stores the sounds in the image and sound storing unit 218 together with an image captured at the image capturing t2 in a corresponding manner.

Then, in case the voice judging unit 260 judges that no human voice is included in the sounds recorded by the recording unit 250 during the period (t1~t3), which includes the image capturing time t2 and is set to the image capturing mode, a sound recorded at a position nearest to the image capturing position detected by the image capturing position detecting unit 264 is acquired from sounds recorded during a period which includes the period (t1~t3) and is set to the waiting mode or the output mode, for example, a period (t0~t5) and stored in the sound database 280 and the acquired sound is stored in the image and sound storing unit 218 with the image captured at the time t2 in a corresponding manner.

Further, the sound acquiring unit 262 may acquire a sound recorded at a time nearest to the image capturing time t2 out of the sounds recorded by the recording unit 250 during the period (t1~t3), which includes the image capturing time t2 and is set to the image capturing mode, which includes a human voice. Further, the sound acquiring unit 262 may acquire a sound of which volume is the largest out of the sounds recorded by the recording unit 250 during the period (t1~t3), which includes the image capturing time t2 and is set to the image capturing mode, which includes a human voice. Further, the sound acquiring unit 262 may acquire a sound including a human voice of which volume is the largest. For example, the sound acquiring unit 262 may acquire a sound of which frequency band peculiar to a human voice, for example, between 100 Hz to 5000 Hz, has the largest volume, out of sounds recorded by the recording unit 250 which includes a human voice.

Figure 5:
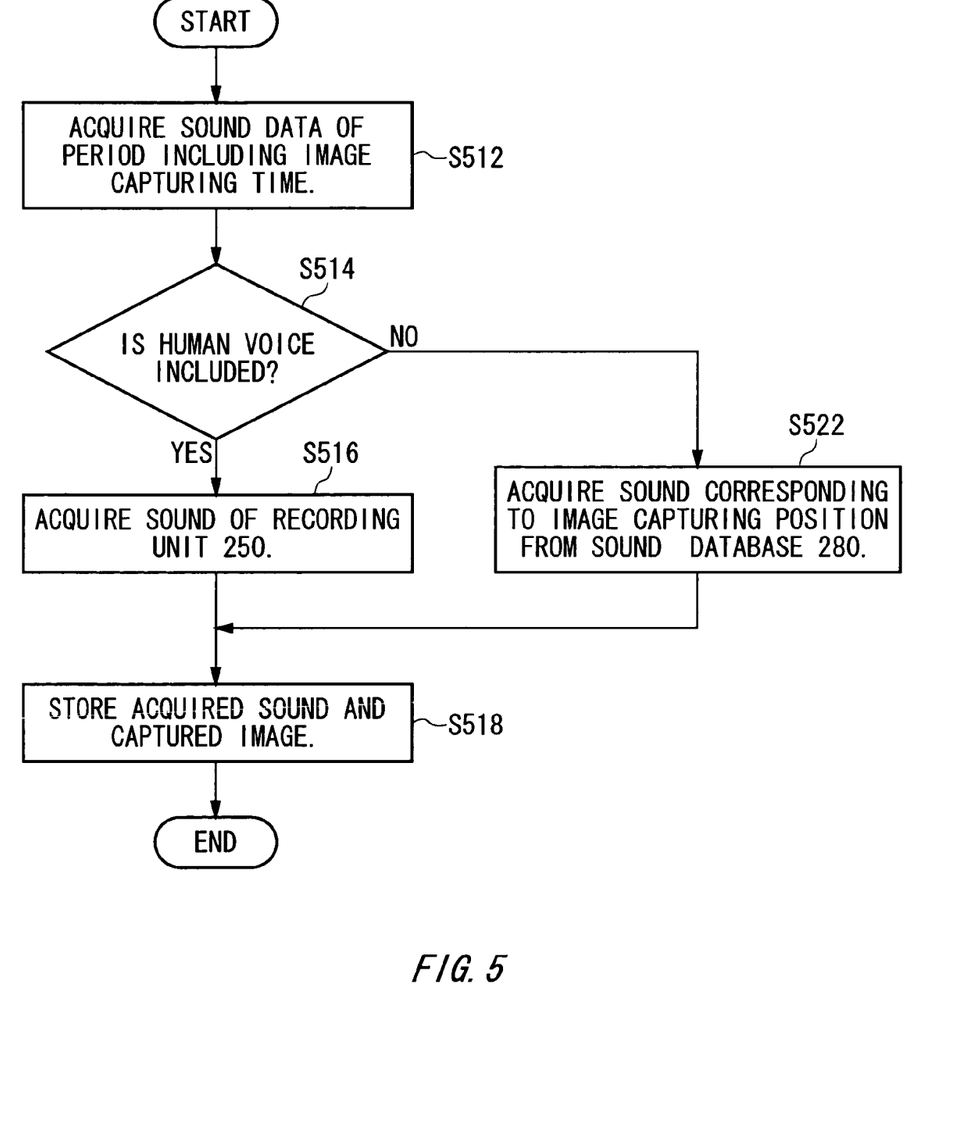
FIG. 5 shows an example of an order of storing captured images and sounds.

FIG. 5 shows an example of an order of storing captured images and sounds. The sound acquiring unit 262 determines a period during which the image capturing apparatus 100 is set to the image capturing mode and which includes the time when the image capturing unit 202 captures an image (S512). Then, the voice judging unit 260 judges whether or not sounds recorded during the period determined in S512 includes a human voice (S514). In case the voice judging unit 260 judges that the sounds recorded during the period determined in S512 includes a human voice in S514 (S514: YES), the sounds recorded by the recording unit 250 is acquired (S516). Then, the image and sound storing unit 218 stores the image captured by the image capturing unit 202 and the sound acquired by the sound acquiring unit 262 in S516 in a corresponding manner (S518).

In case the voice judging unit 260 judges that the sounds recorded during the period determined in S512 includes no human voice in S514 (S514: NO), the sound acquiring unit 262 searches the sound database 280 to search for and acquire a sound recorded at a position nearest to the latitude and altitude detected by the image capturing position detecting unit 264. Then, the image and sound storing unit 218 stores the image captured by the image capturing unit 202 and the sound acquired by the sound acquiring unit 262 in S522 in a corresponding manner (S518).

Further, in case there are a plurality of sounds recorded at the image capturing position in the sound database 280 in S522, the sound acquiring unit 262 may acquire a sound recorded at a time nearest to the image capturing time. In addition, in case there are a plurality of sounds recorded at the image capturing position in the sound database 280 in S522, the sound acquiring unit 262 may acquire a sound of which volume is the largest. Further, the sound acquiring unit 262 may acquire more than one sound from the sound database 280 so that the total time of the acquired sound(s) is equal or larger than an output time that is a period during which the captured image should be output.

According to the image capturing apparatus 100 described above, for example, in case a sound recorded when the user 180 captures an image of a child on the seashore includes no human voice, it is possible to record a sound recorded at a position nearest to the image capturing position out of sounds previously recorded at the same seashore together with the image. Therefore, the image capturing apparatus 100 can record a sound to be recorded at a place where an image is captured together with the image.

Figure 6:
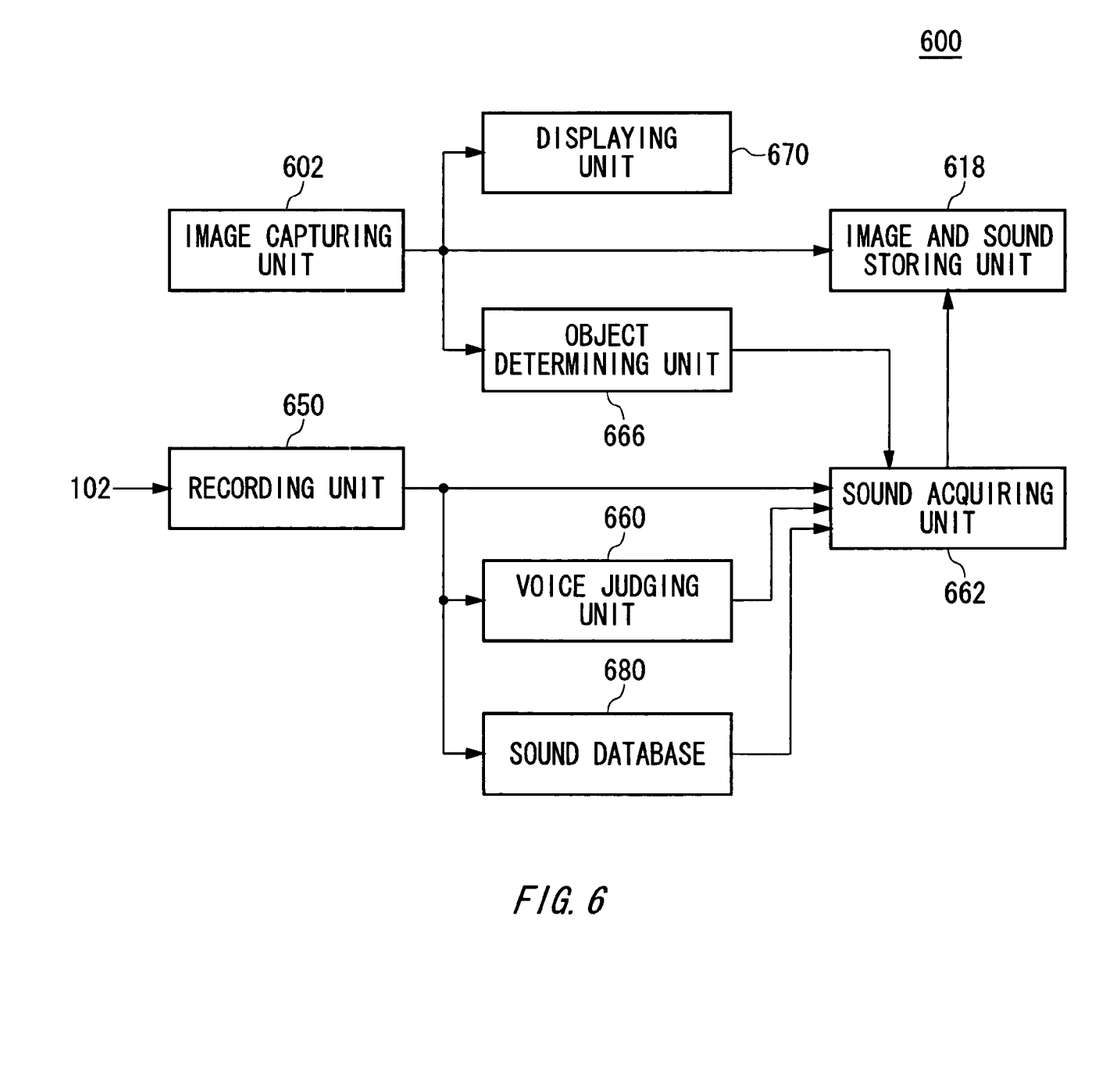
FIG. 6 shows an example of the configuration of an image capturing apparatus 600.

FIG. 6 shows an example of the configuration of an image capturing apparatus 600. The image capturing apparatus 600 is another example of the image capturing apparatus 100 having the sound offering system described with respect to FIG. 1. Since the image capturing apparatus 600 is used under conditions similar with those of the image capturing apparatus 100 described with respect to FIG. 1, only difference between the conditions will be described in the following. In other words, in case sounds collected by the collector 102 include no human voice, the image capturing apparatus 600 determines the kind of an object of which image is captured and stores a sound which was previously recorded when an image of the object was captured or a sound acquired from the sound database 160 for storing sounds of the object together with the captured image in a corresponding manner. For example, in case sounds collected by the collector 102 include no human voice and a dog is shown in the captured image, the image capturing apparatus 600 acquires a sound of the barking of a dog from the sound database 160 or a sound database of the image capturing apparatus 600 and record the sound with the image. Therefore, the image capturing apparatus 600 can provide the user with a sound proper for the object.

The image capturing apparatus 600 includes an image capturing unit 602, a displaying unit 670, an image and sound storing unit 618, an object determining unit 666, a recording unit 650, a sound acquiring unit 662, a voice judging unit 660, and a sound database 680. The operations and functions of the image capturing apparatus 600 will be omitted with the exception of differences from those of the image capturing apparatus 100. Specifically, the operations and functions of the image capturing unit 602, the recording unit 650, the voice judging unit 660, the image and sound storing unit 618, and the displaying unit 670 may be the same as those of the image capturing unit 202, the recording unit 250, the voice judging unit 260, the image and sound storing unit 218, and the displaying unit 270, respectively. Further, the present invention may include an image capturing apparatus of which operations and functions are a combination of those of the image capturing apparatus 100 and the image capturing apparatus 600.

The object determining unit 666 determines the kind of an object of an image captured by the image capturing unit 602. Specifically, the object determining unit 666 extracts a contour of an object included in an image captured by the image capturing unit 602 by an edge extraction and the like and determines the kind of the object by a pattern matching between the extracted contour and a pattern prepared for each kind of objects. The sound database 680 stores a sound recorded by the recording unit 650 corresponding to the kind of an object which has been determined by the object determining unit 666 when the sound has been recorded.

In case the voice judging unit judges that a human voice is included in a sound recorded by the recording unit 650, the sound acquiring unit 662 acquires the sound. Then, in case the voice judging unit 660 judges that no human voice is included in a sound recorded by the recording unit 650, the sound acquiring unit 662 acquires a sound corresponding to the kind of the object determined by the object determining unit 666 from the sound database 680.

Further, the sound database 680 further stores the time when the sound has been recorded by the recording unit 650 with the sound in a corresponding manner. Then, the voice judging unit 660 judges whether or not a human voice is included in sounds recorded for a predetermined first period from the time when the image capturing unit 602 captures an image. Then, in case the voice judging unit 660 judges that a human voice is included within the first period, the sound acquiring unit 662 acquires the sound recorded by the recording unit 650. Further, in case the voice judging unit 660 judges that no human voice is included within the first period, the sound acquiring unit 662 acquires a sound recorded within a second period which is broader than the first period from the image capturing time of the image capturing unit 602, which is stored in the sound database 680 and corresponds to the kind of the object determined by the object determining unit 666.

Further, the first period may be a period during which the image capturing apparatus 600 is set to an image capturing mode, that is, an operation mode where the displaying unit 670 displays an image. Furthermore, the second period may be a period including the first period and a period during which the image capturing apparatus 600 is set to a non image capturing mode, that is, an operation mode where the displaying unit 670 does not display an image.

Figure 7:
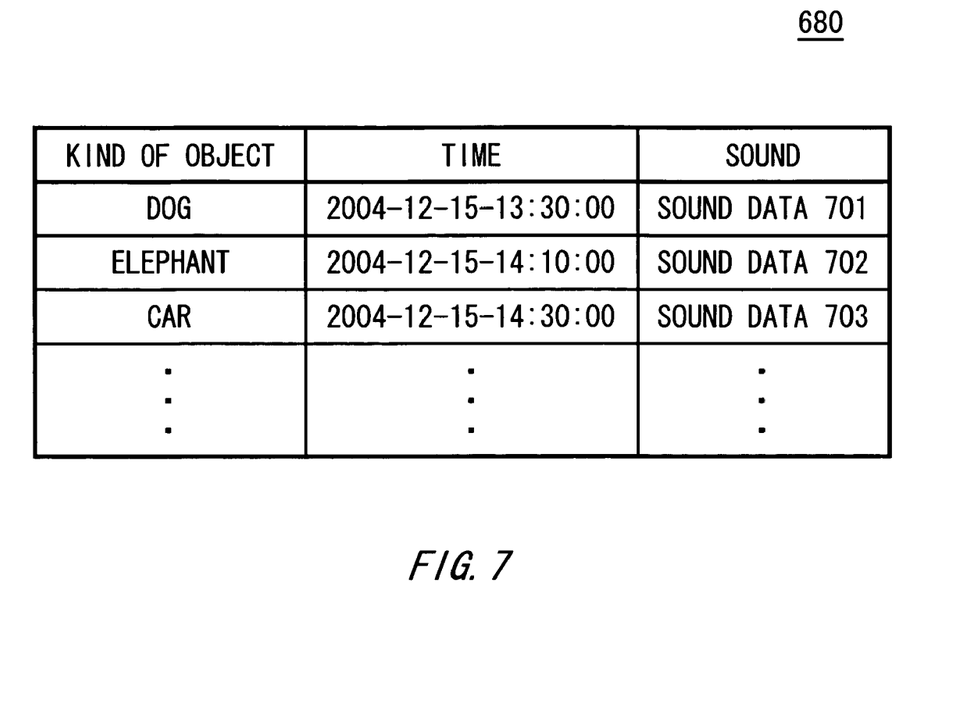
FIG. 7 shows an example of data stored in a sound database 680 in the form of a table.

FIG. 7 shows an example of data stored in a sound database 680 in the form of a table. The sound database 680 stores a plurality of sound data (701, 702, 703) with the kind of an object determined by the object determining unit 666 when each of the plurality of sound data is recorded and the time when the sound data is recorded.

Further, the time when a sound is recorded may be the time when the sound recording is started or ended. Further, the time when a sound is recorded may include date and time when the sound is recorded. Further, the sound database 680 stores a sound in length of an output time, that is, a period during which the captured image is to be output.

Figure 8:
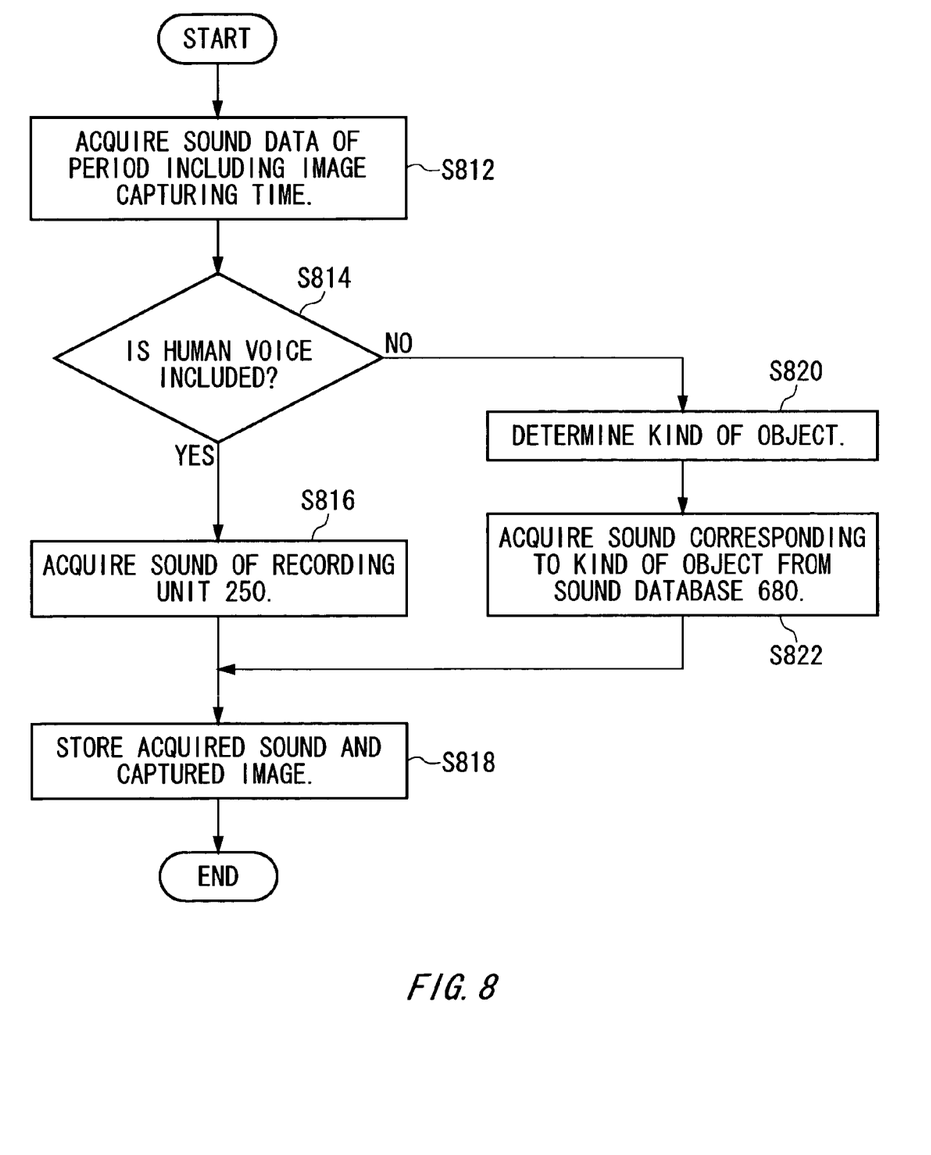
FIG. 8 shows an example of an order of storing captured images and sounds.

FIG. 8 shows an example of an order of storing captured images and sounds. The sound acquiring unit 662 determines a period during which the image capturing apparatus 600 is set to the image capturing mode and which includes the time when the image capturing unit 602 captures an image (S812). Then, the voice judging unit 660 judges whether or not sounds recorded during the period determined in S812 includes a human voice (S814). In case the voice judging unit 660 judges that the sounds recorded during the period determined in S812 includes a human voice in S814 (S814: YES), the sounds recorded by the recording unit 650 is acquired (S816). Then, the image and sound storing unit 618 stores the image captured by the image capturing unit 602 and the sound acquired by the sound acquiring unit 662 in S816 in a corresponding manner (S818).

In case the voice judging unit 660 judges that the sounds recorded during the period determined in S812 includes no human voice in S814 (S814: NO), the object determining unit 666 determines the kind of an object shown in the image captured by the image capturing unit 602 (S820). The sound acquiring unit 662 searches information on the kinds of objects stored in the sound database 680 and acquires a sound corresponding to an object which accords with the object determined by the object determining unit 666 from the sound database 680 (S822). Then, the image and sound storing unit 618 stores the image captured by the image capturing unit 602 and the sound acquired by the sound acquiring unit 662 in S822 in a corresponding manner (S818).

Further, the sound acquiring unit 662 may acquire more than one sound from the sound database 680 so that the total time of the acquired sound(s) is equal or larger than an output time that is a period during which the captured image should be output.

According to the image capturing apparatus 600 described above, for example, in case a sound recorded when the user 180 captures an image including an object on the seashore includes no human voice, it is possible to record a sound recorded when an image of the same kind of object as the object was captured previously. Therefore, the image capturing apparatus 600 can provide the user 180 with an image and a sound which is to be recorded when the image is captured.

Figure 9:
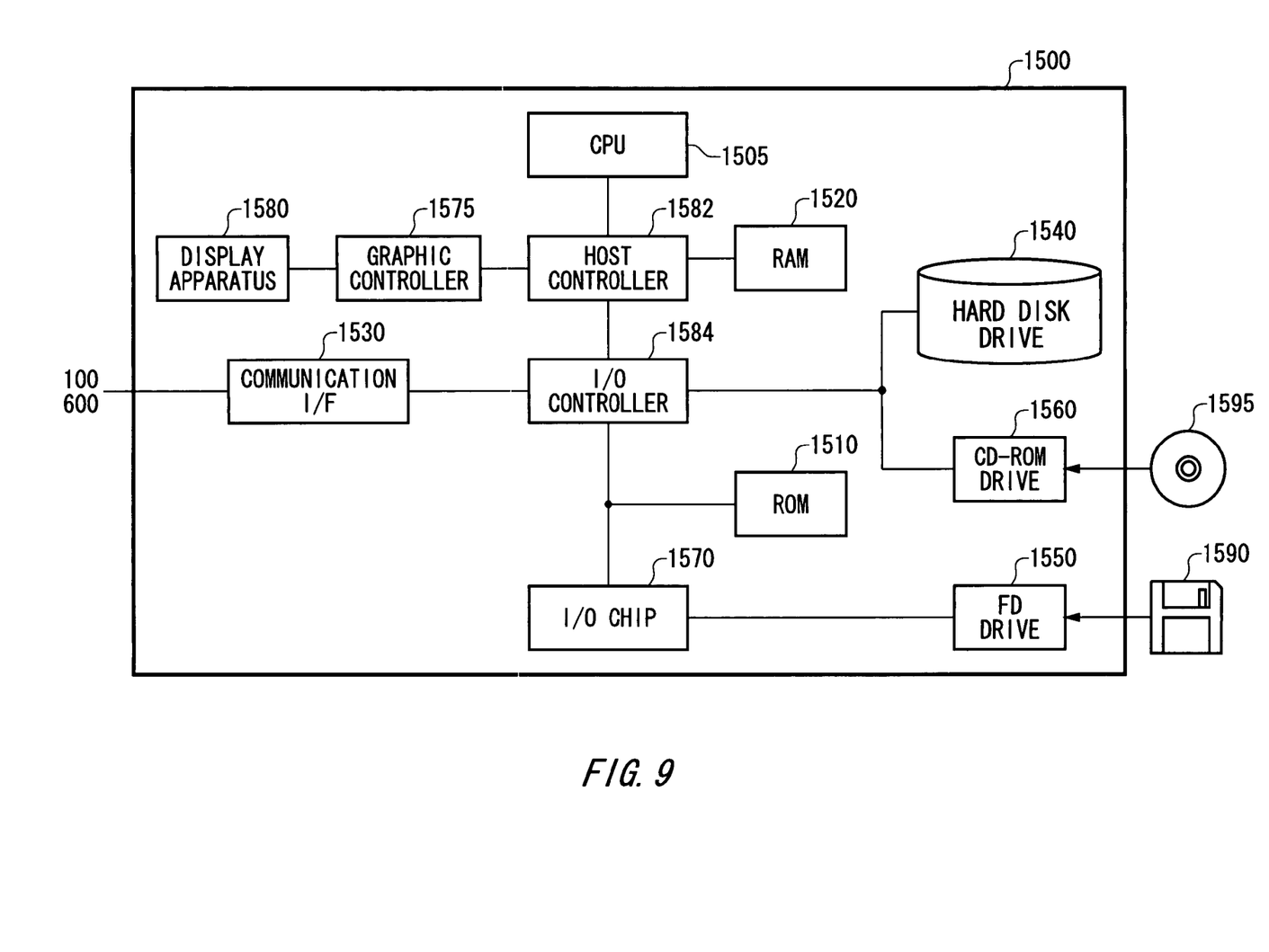
FIG. 9 is a block diagram showing an example of a hardware configuration of a computer 1500 for the image capturing apparatus 100 and the image capturing apparatus 600.

FIG. 9 is a block diagram showing an example of a hardware configuration of a computer 1500 for the image capturing apparatus 100 and the image capturing apparatus 600. The computer 1500 according to the embodiment of the present invention includes a CPU peripheral part comprising a CPU 1505, a RAM 1520, a graphic controller 1575, and a display apparatus 1580 which are connected with each other by a host controller 1582, an input and output part comprising a communication interface 1530 connected to the host controller 1582 by an input and output controller 1584 ("I/O controller 1584"), a hard disk drive 1540, and a CD-ROM drive 1560, and a legacy input and output part comprising a ROM 1510 connected to the I/O controller 1584, a flexible disk drive 1550, and an input and output chip 1570 ("I/O chip 1570").

The host controller 1582 connects the RAM 1520 with the CPU 1505 having access to the RAM 1520 at a high transmission rate and the graphic controller 1575. The CPU 1505 operates and performs control of each part on the basis of programs stored in the ROM 1510 and the RAM 1520. The graphic controller 1575 acquires image data which is generated on a frame buffer provided in the RAM 1520 by the CPU 1505, etc. and displays it on the display apparatus 1580. Instead, the graphic controller 1575 may include a frame buffer storing an image data generated by the CPU 1505, etc. therein.

The I/O controller 1584 connects the host controller 1582 with the hard disk drive 1540, the communication interface 1530, and the CD-ROM drive 1560, which are relatively high-speed I/O apparatus. The hard disk drive 1540 stores a program and data used by the CPU 1505 in the computer 1500. The communication interface 1530 communicates with the image capturing apparatus 100 or the image capturing apparatus 600 via a network and provides the image capturing apparatus 100 or the image capturing apparatus 600 with a program or data. The CD-ROM drive 1560 retrieves a program or data from a CD-ROM 1595 and provides the hard disk drive 1540 and the communication interface 1530 with it via the RAM 1520.

Further, the I/O controller 1584 is connected with the ROM 1510 and a relatively low-speed I/O apparatus such as the flexible disk drive 1550 and the I/O chip 1570. The ROM 1510 stores a program executed by the CPU 1500 when the computer 1500 starts to operate, a program depending on the hardware of the computer 1500, and the like. The flexible disk drive 1550 retrieves a program or data from a flexible disk 1590 and provides the hard disk drive 1540 and the communication interface 1530 with it via the RAM 1520. The I/O chip 1570 connects the flexible disk drive 1550 with various I/O apparatus via a parallel port, a serial port, a keyboard port, a mouse port, and the like.

A program provided to the communication interface 1530 via the RAM 1520 is stored in a recording medium such as the flexible disk 1590, the CD-ROM 1595, or an IC-card and provided by a user. The program is retrieved from the recording medium, provided to the communication interface 1530 via the RAM 1520, and sent to the image capturing apparatus 100 or the image capturing apparatus 600 via a network. The program sent to the image capturing apparatus 100 or the image capturing apparatus 600 is installed and executed on the image capturing apparatus 100 or the image capturing apparatus 600.

The program installed and executed on the image capturing apparatus 100 makes the image capturing apparatus 100 function as the image capturing apparatus 100 described with respect to FIGS. 1 to 5. The program installed and executed on the image capturing apparatus 600 makes the image capturing apparatus 600 function as the image capturing apparatus 600 described with respect to FIGS. 6 to 8.

The program described above may be stored in a recording medium of the outside. An optical recoding medium such as a DVD, a PD, etc., a magneto-optical recording medium such as an MD, a tape medium, and a semiconductor memory such as an IC card can be used as the recoding medium in addition to the flexible disk 1590 and the CD-ROM 1595. Further, a storing apparatus such as a hard disk or a RAM provided in a server system connected with a dedicated communication network and internet may be used as the recording medium and may provide the computer 1500 with the program through the network.

Although the present invention has been described by way of exemplary embodiments, it should be understood that those skilled in the art might make many changes and substitutions without departing from the spirit and the scope of the present invention which is defined only by the appended claims.

What is claimed is:

1. An image capturing apparatus comprising:
an image capturing unit for capturing an image;
an image capturing position detecting unit for detecting the position where said image capturing unit captures an image;
a recording unit for recording a sound around said image capturing unit;
a voice judging unit for judging whether or not the sound recorded by said recording unit includes a human voice;
a sound acquiring unit for acquiring the sound recorded by said recording unit in case said voice judging unit judges that a human voice is included and acquiring a sound which a sound database stores correspondingly to the position detected by said image capturing position detecting unit in case said voice judging unit judges that no human voice is included; and
an image and sound storing unit for storing the image captured by said image capturing unit and the sound acquired by said sound acquiring unit in a corresponding manner.

2. The image capturing apparatus as claimed in claim 1, wherein said sound database stores the sound recorded by said recording unit with the time when the sound is recorded in a corresponding manner, said voice judging unit judges whether or not a human voice is included in sounds within a predetermined first period including the time when said image capturing unit captures the image, and in case said voice judging unit judges that a human voice is included within the first period, said sound acquiring unit acquires the sound recorded by said recording unit, and in case said voice judging unit judges that no human voice is included within the first period, said sound acquiring unit acquires a sound recorded during a second period which includes and is broader than the first period and stored in said sound database correspondingly with the position detected by said image capturing position detecting unit.

3. The image capturing apparatus as claimed in claim 2 further comprising: a displaying unit for displaying an image of light received by a light receiving element of said image capturing unit, wherein the first period is a period during which the image capturing apparatus is set to an image capturing mode, that is, an operation mode where said displaying unit is displaying an image, and the second period is a period including the first period and a period during which the image capturing apparatus is set to a non image capturing mode, that is, an operation mode where said displaying unit does not display an image.

4. An image capturing method comprising:
an image capturing step of capturing an image using an image capturing unit;
an image capturing position detecting step of detecting the position where the image capturing unit captures an image;
a recording step of recording a sound around the image capturing unit;
a voice judging step of judging whether or not the sound recorded in said recording step includes a human voice;
a sound acquiring step of acquiring the sound recorded in said recording step in case it is judged in said voice judging step that a human voice is included and acquiring a sound which a sound database stores correspondingly to the position detected in said image capturing position detecting step in case it is judged in said voice judging step that no human voice is included; and
an image and sound storing step of storing the image captured by the image capturing unit and the sound acquired in said sound acquiring step in a corresponding manner.

5. A machine readable medium storing thereon a program for an image capturing apparatus for capturing an image, wherein the program makes the image capturing apparatus function as
an image capturing unit for capturing an image;
an image capturing position detecting unit for detecting the position where said image capturing unit captures an image;
a recording unit for recording a sound around said image capturing unit;
a voice judging unit for judging whether or not the sound recorded by said recording unit includes a human voice;
a sound acquiring unit for acquiring the sound recorded by said recording unit in case said voice judging unit judges that a human voice is included and acquiring a sound which a sound database stores correspondingly to the position detected by said image capturing position detecting unit in case said voice judging unit judges that no human voice is included; and
an image and sound storing unit for storing the image captured by said image capturing unit and the sound acquired by said sound acquiring unit in a corresponding manner.

6. An image capturing apparatus comprising:
an image capturing unit for capturing an image;
an object determining unit for determining the kind of an object of an image captured by said image capturing unit;
a recording unit for recording a sound around said image capturing unit;
a voice judging unit for judging whether or not the sound recorded by said recording unit includes a human voice;
a sound acquiring unit for acquiring the sound recorded by said recording unit in case said voice judging unit judges that a human voice is included and acquiring a sound which a sound database stores correspondingly to the kind of the object determined by said object determining unit in case said voice judging unit judges that no human voice is included; and
an image and sound storing unit for storing the image captured by said image capturing unit and the sound acquired by said sound acquiring unit in a corresponding manner.

7. The image capturing apparatus as claimed in claim 6, wherein
said sound database stores the sound recorded by said recording unit with the time when the sound is recorded in a corresponding manner,
said voice judging unit judges whether or not a human voice is included in sounds within a predetermined first period from the time when said image capturing unit captures the image, and
in case said voice judging unit judges that a human voice is included within the first period, said sound acquiring unit acquires the sound recorded by said recording unit, and in case said voice judging unit judges that no human voice is included within the first period, said sound acquiring unit acquires a sound recorded during a second period which is broader than the first period from the image capturing time of said image capturing unit and stored in said sound database correspondingly with the kind of the object determined by said object determining unit.

8. The image capturing apparatus as claimed in claim 7 further comprising: a displaying unit for displaying an image of light received by a light receiving element of said image capturing unit, wherein the first period is a period during which the image capturing apparatus is set to an image capturing mode, that is, an operation mode where said displaying unit is displaying an image, and the second period is a period including the first period and a period during which the image capturing apparatus is set to a non image capturing mode, that is, an operation mode where said displaying unit does not display an image.

9. An image capturing method comprising:
   an image capturing step of capturing an image using an image capturing unit;
   an object determining step of determining the kind of an object of an image captured by said image capturing unit;
   a recording step of recording a sound around the image capturing unit;
   a voice judging step of judging whether or not the sound recorded in said recording step includes a human voice;
   a sound acquiring step of acquiring the sound recorded in said recording step in case it is judged in said voice judging step that a human voice is included and acquiring a sound which a sound database stores correspondingly to the kind of the object determined in said object determining step in case it is judged in said voice judging step that no human voice is included; and
   an image and sound storing step of storing the image captured by the image capturing unit and the sound acquired in said sound acquiring step in a corresponding manner.

10. A machine readable medium storing thereon a program for an image capturing apparatus for capturing an image, wherein the program makes the image capturing apparatus function as
   an image capturing unit for capturing an image;
   an object determining unit for determining the kind of an object of an image captured by said image capturing unit;
   a recording unit for recording a sound around said image capturing unit;
   a voice judging unit for judging whether or not the sound recorded by said recording unit includes a human voice;
   a sound acquiring unit for acquiring the sound recorded by said recording unit in case said voice judging unit judges that a human voice is included and acquiring a sound which a sound database stores correspondingly to the kind of the object determined by said object determining unit in case said voice judging unit judges that no human voice is included; and
   an image and sound storing unit for storing the image captured by said image capturing unit and the sound acquired by said sound acquiring unit in a corresponding manner.

* * * * *